Sept. 14, 1937.    A. L. LEAVITT    2,093,049
SURVEYING APPARATUS
Filed April 26, 1937    2 Sheets-Sheet 1
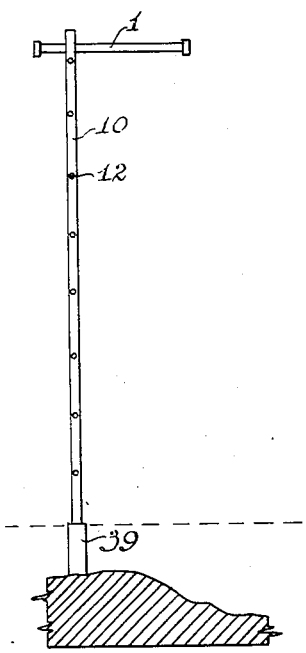
Fig. 1
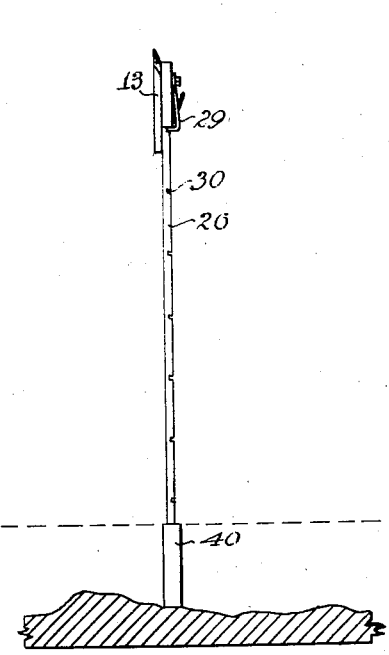
Fig. 2
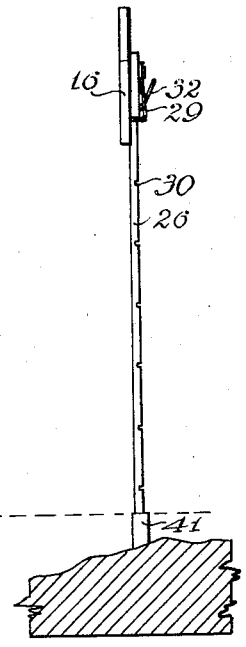
Fig. 3
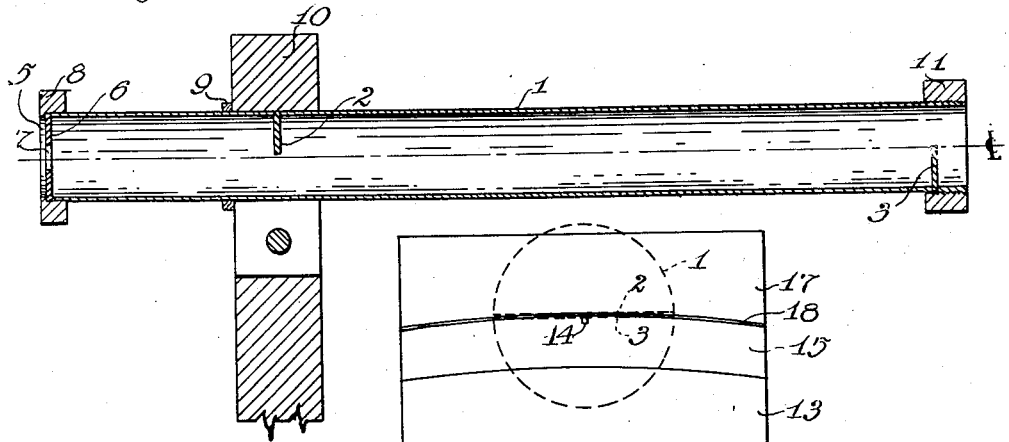
Fig. 4
Fig. 5
INVENTOR.
Albert L. Leavitt
BY
Thomas D. Lane
ATTORNEY.

Sept. 14, 1937.  A. L. LEAVITT  2,093,049
SURVEYING APPARATUS
Filed April 26, 1937   2 Sheets-Sheet 2
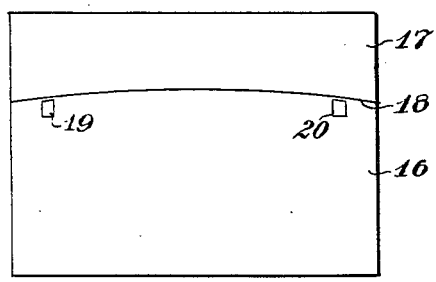
Fig.6
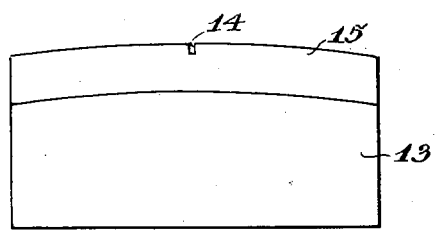
Fig.7
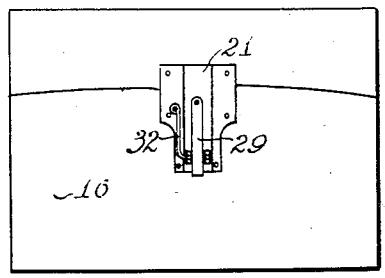
Fig.8
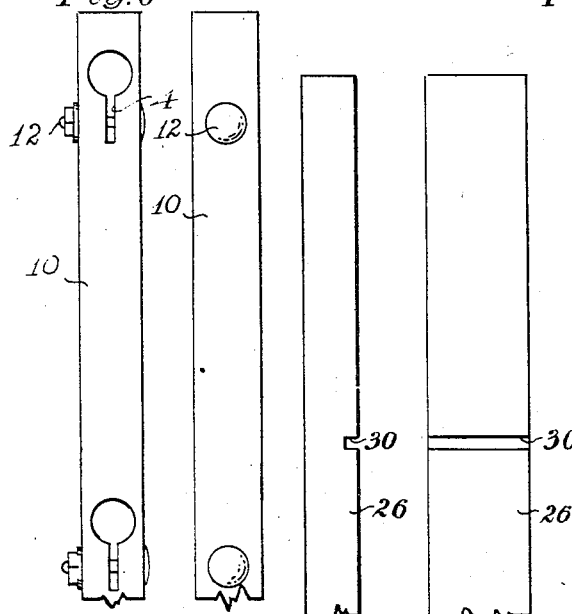
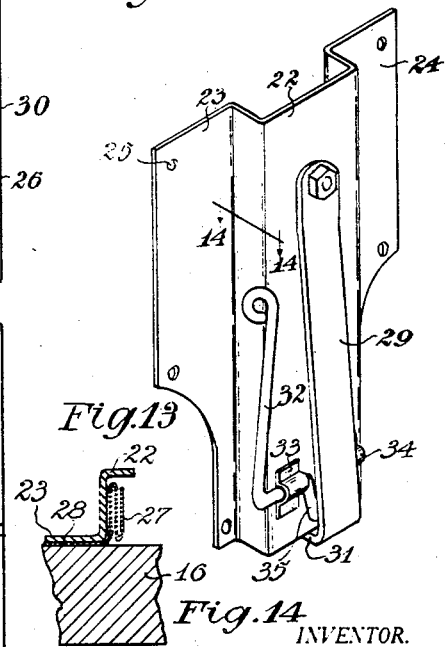
Fig.13
Fig.14
Fig.9  Fig.10  Fig.11  Fig.12
INVENTOR.
Albert L. Leavitt
BY
ATTORNEY.

Patented Sept. 14, 1937

2,093,049

UNITED STATES PATENT OFFICE 2,093,049

SURVEYING APPARATUS

Albert L. Leavitt, Minneapolis, Minn.

Application April 26, 1937, Serial No. 138,911

6 Claims. (Cl. 33—46)

The present invention relates to surveying apparatus and more particularly to a simple and accurate apparatus for the extension of grades and levels.

In the running of grades and levels where it is desired to either project a grade beyond a known point, or to obtain intermediate grades between two known points, such as in the grading of areas such as airports and roads, and the laying of pipe lines and similar projects, it is frequently desirable to have a simple and positive apparatus which can be used by unskilled members of a construction crew after a small amount of experience, so that after an initial survey by a regular surveying crew it will be possible for the construction crew to obtain extensions or intermediate grades. This results in a very material saving, both in time and money, and greatly facilitates construction work and provides an accurate check on the work of the surveyors.

An object of the present invention is to make an improved and simplified sighting device.

Another object is to make an improved and simplified set of surveying apparatus.

Another object is to make a sighting apparatus having a pair of longitudinally spaced oppositely disposed interceptors mounted to blank out the line of sight beyond a critical point.

Another object is the provision of a pair of sighting elements adjustable to a plurality of predetermined positions and used in conjunction with a sighting device which is adapted to be mounted at a predetermined height with respect to its base so that the related elements can be brought into line by an adjustment of a base support of either of the sighting elements.

In order to attain these objects there is provided, in accordance with one feature of the invention, a tubular sighting device mounted at right angles to a support member and adjustable to different heights thereon. The sighting tube is provided with a pair of oppositely disposed light interceptors mounted transversely of the interior thereof. The tube is mounted in the support member with one of said interceptors positioned centrally of said supporting member and at a known height from the base of said supporting member.

A sighting target is adjustably mounted on a supporting member, the target being marked in contrasting colors and an intermediate sighting element, also marked in contrasting colors, is similarly mounted on a support, at a known height from its base. By sighting between said interceptors over said intermediate sighting member toward said target the three elements can readily be brought into exact alignment.

These and other features of the invention will be more fully brought out in the following description and in the accompanying drawings, wherein, Figure 1 is a view in side elevation of a sighting device embodying the present invention supported on a stake having its top at a known elevation or grade, Figure 2 is a similar view of an intermediate sighting element mounted on a stake of either known or unknown elevation, Figure 3 is a similar view of a sighting target, Figure 4 is a longitudinal vertical sectional view through a tubular sighting device embodying the present invention, a fragment of a supporting post being shown in conjunction therewith, Figure 5 is a schematic view showing how the intermediate sighting device and the target appear when viewed in alignment through the sighting device, Figure 6 is a view in front elevation of a sighting target or panel, Figure 7 is a similar view of an intermediate sighting member, Figure 8 is a rear view of the sighting target shown in Figure 6, Figure 9 is a view in elevation showing one side of a support for the sighting device, Figure 10 is a view in side elevation of the support shown in Figure 9 and taken at ninety degrees from the position of Figure 9, Figure 11 is an edge view of a support member of a type used to support the target and intermediate sighting panel, Figure 12 is a side view of the support shown in Figure 11, Figure 13 is a view in isometric projection of a mounting device for receiving the support posts for the target and intermediate sighting device, and, Figure 14 is a fragmentary sectional view taken as on the line 14—14 of Figure 13 showing a spring mounted within the post-receiving channel of the device shown in Figure 13 to frictionally engage a support post when mounted therein.

Referring to the drawings in detail the sighting device comprises a tube 1 which may be of metal having a transverse interceptor partition 2 mounted therein. The interceptor 2 is preferably mounted about four inches from the ocular end of the tube so as to position the interceptor 2 at the proper focal distance from the eye of the operator. The lower edge of the interceptor 2 is parallel to a diameter of the tube and is positioned just slightly above the diameter (approximately five thousandths of an inch has been found a suitable distance). A second interceptor 3 is positioned adjacent the objective end of the tube 1 and, extending upwardly from the bottom of the tube, has its upper edge exactly on a diameter and parallel to the lower edge of the interceptor 2. A disc 6 is mounted over the ocular end of the tube and is provided with a sight opening 7 centrally thereof. The disc 6 is held in position by means of a ring 8 which may be fixedly mounted on the tube 1 as by brazing since normally it is unnecessary to disassemble this end of the device. A stop collar 9 may be mounted around the tube 1 to engage a side of the supporting post 10, so that in inserting the tube 1 in an opening in the supporting post the engagement of the stop collar 9 with a side of the post 10 will position the interceptor 2 in the approximate center of the post 10.

A ring 11 is threaded onto the objective end of the tube 1 to reenforce the tube end to prevent injury thereto in case the tube is subjected to abuse as it has been found frequently occurs with the device in the hands of inexperienced operators. In removing the tube from the opening in the support post 10 the ring 11 is unscrewed from the tube to permit its withdrawal.

Openings in the support post 10 to receive the tube 1 are preferably provided at intervals of six inches, center to center although this is an arbitrary figure and is not important except that the operator must know the distance of the center of the sighting tube from the bottom of the support post 10. Slots 4 are provided below each of the openings in the support post 10 and a bolt 12 is mounted transversely of the post 10 through each of these slots, so that by tightening the bolt 12 the tube 1 will be firmly gripped in position in the opening in which it is mounted. The preferred normal working height of the center of the tube from the base of the support is four feet, and it is seldom necessary to change this adjustment except in working in unusual terrain where the height of the stakes requires a different adjustment.

The intermediate sighting device comprises a panel 13 (see Figures 2, 5, and 7) the upper edge thereof being curved on a circular arc having a radius of four feet when that is the normal working height of the device. A notch 14 is provided in the center of this curved upper edge to facilitate the sighting operation as will be later brought out in the description of the operation of the device.

A stripe 15 across the upper portion of the face of the intermediate sighting panel 13 is painted a strongly contrasting color from the remainder thereof. My preferred color combination is a bright red stripe 15 with the remainder of the panel a brilliant white. These colors have been found in actual use to stand out very clearly against any background encountered and this contrast greatly facilitates the sighting operation.

A target member 16 comprises a rectangular panel having an upper portion 17 above the arcuate line 18 which preferably has a radius of curvature approximately one quarter of an inch greater than the radius of the curved upper edge of the intermediate sighting panel 13. In my preferred construction the top edge of the intermediate panel 13 is a circular arc with a radius of four feet, and the arc 18 has a radius of four feet one quarter inch. Positioned one quarter of an inch below the arc 18 on each side of the panel 16 are two spots 19 and 20 the upper edges of which are curved concentrically with the line 18. These spots are preferably painted the same color as the upper portion 17 of the target panel 16. If preferred, the panel 16 may be assembled of two separable portions divided on the line 18. This construction facilitates repainting the panel, since by removing the upper portion 17 of the panel in repainting it red for instance, and painting the lower portion white while thus disassembled, the division line 18 between the lower portion and the upper portion 17 would always be clearly defined.

A channeled mounting bracket 21 is mounted on the back of the target panel 16. It comprises a channel portion 22 with side flanges 23 and 24. Bolt holes 25 are provided in the flanges 23 and 24 by means of which the device may be fastened to the panel. The channel portion 22 is of a size to receive a support post 26 (see Figures 2, 3, 5, 11, and 12.)

An S spring 27 (see Figure 14) is mounted along one side of the channel 22 and has a portion 28 extending beneath the flange 23 to be securely gripped thereby to hold the spring 27 in position within the channel 22. This spring member 27 is made of a ribbon of light bronze sheet material of a type frequently used for weather-stripping sliding-sash windows, and resiliently engages a side of the support post 26 to frictionally grip the post 26 and hold the target in position on the post without danger of wobble movement.

A spring tongue 29 is mounted on the rear face of the channel 22 and extends angularly outwardly therefrom to a point below the lower end of the channel portion 22 where it is bent inwardly as at 31 to a position at right angles to the longitudinal axis of the channel 22. In its normal position the portion 31 extends inwardly into the channel 22 so that when in registry with a notch 30 on the rear face of support post 26 the inwardly bent end 31 of the tongue 29 will enter the slot 30 and lock the target mounted on the support member 21 firmly in position. A release lever 32 is pivoted in bearing members 33 and 34 and has a throw 35 extending downwardly beneath the tongue 29, so that by depressing the lever 32 the portion 31 of the tongue 29 will be raised out of engagement with the slot 30 when it is desired to slidably move the target with respect to the post 26.

A similar channeled bracket is provided for the intermediate sighting device 13 with the exception that the bracket for the sighting element is preferably shortened at its upper end so that the inturned end of the spring tongue 31 when in engagement with one of the notches 30 will bring the curved upper edge of the intermediate sighting member to a height with respect to the lower end of the supporting post 26 one quarter of an inch less than the height of the line 18 on the target member 16 when the target member is mounted with the portion 31 of the spring tongue 29 in engagement with a notch 30 at the same height as that of the intermediate sighting member.

*Operation.*—In using the apparatus above described we will assume that two stakes 39 and 40 (see Figure 1) have been previously set to a required grade by a surveying crew, and that it is desired to extend the grade beyond the post 40. We will also assume that the instruments are constructed to have a normal working height of four feet above their bases.

The sighting tube 1 is mounted in a convenient opening in the post 10, which we will assume is the uppermost opening in the post, with the center of the tube 1 exactly four feet above the lower end of the post 10. The intermediate sighting device has the panel 13 thereof mounted with the portion 31 of the spring tongue 29 engaging the uppermost notch 30 in the post 26, to bring the center of the curved upper edge of the panel 13 to the same height with respect to the bottom of the post 26, as the center of the tube 1 is from the bottom of the post 10, in this case, four feet. The target panel 16 is also mounted with the center of the line 18 a quarter of an inch above the height of the center of the upper edge of the intermediate panel. We will also assume that the established grade is horizontal.

The operator of the sighting tube places the post 10 thereof on the stake 39, and a second operator places the post 26 of the intermediate sighting panel 13 on the post 40. The grade of both of these posts being previously established by a surveying crew using the customary surveying instruments. At the point where the grade extension is desired to be found the sighting panel 16 is placed by an operator, who watches the sighting tube operator for signals as to where to locate the target. The operator of the sighting device then sights through the tube 1 over the upper edge of the intermediate sighting panel 13. During this operation the operator tilts the post 10 toward his eye until there is just a thin line of light appearing over the top of the interceptor 3 and beneath the interceptor 2. The operator then sights over the top of the intermediate panel 13 toward the target 16. By using conventional hand signals to direct the operator handling the target, the target is brought into line with the tube 1 and the intermediate panel 13. A stake 41 is then started into the ground and is preferably left slightly higher than the estimated required grade, and the lower end of the target support post 26 is placed on this stake as shown in Figure 1. The sighting tube operator then signals to the target operator who drives the stake 41 in as required until the top of the stake is at the proper grade. When this is attained the curved line 18 on the target 16 will appear just over the curved upper edge of the intermediate sighting panel 13 as shown in Figure 5. The portions 15 and 17 both being red, the clearance between the curved line 18 on the target 16 and the curved upper edge of the panel 13 shows as a narrow line of white. The spots 19 and 20 on the target 16 will appear above the upper edge of the intermediate sighting panel 13 if the clearance between the line 18 and the upper edge of the intermediate panel 13 is more than one quarter of an inch. The notch 14 in the center of the upper edge of the intermediate panel 13 assists in the aligning of the members, since, as the target approaches the required grade the white lower portion of the target will appear in the notch, so that the operator will be able to accurately judge the amount of adjustment required to bring the elements into line.

After a short period of use even an unskilled operator, operating the sighting device, can develop a high degree of accuracy. In fact on one occasion an unskilled operator, after using the present device but a few days, extended a grade a distance of more than two thousand feet with an error of but one eighth of an inch when checked by means of a surveyor's transit in the hands of an experienced surveyor.

Where it is desired to extend a grade which is not horizontal, the sighting tube, intermediate sighting device and the target may be adjusted on their standards and the stakes spaced to give the required slope. For instance for a slope of 6 inches in 100 feet the stakes would be placed 100 feet apart and the intermediate sighting device would be positioned six inches lower, or higher than the tube, and the target six inches lower, or higher, as the case may be, than the intermediate sighting device. These practices are well known to the art and it is therefore deemed unnecessary to illustrate the practice of this feature of the device.

Also if the established slope is not horizontal the grade may be extended by adjusting all three devices to the same height setting and operating them in the same manner, as that illustrated and described for Figure 1, except that in this case the standards of all the devices will be positioned perpendicularly to the established grade instead of vertically.

I claim:

1. A sighting device having a pair of oppositely disposed, longitudinally offset interceptors mounted on opposite sides of a line of visual reference, one of said interceptors having an edge terminating on said line of visual reference, the other of said interceptors having an edge terminating just short of said line of visual reference to intercept all light rays except a narrow band between the edges of said interceptors to align said line of visual reference toward a remote reference point.

2. A sighting device having a pair of oppositely disposed, longitudinally offset interceptors mounted on opposite sides of a line of visual reference, one of said interceptors having an edge terminating on said line of visual reference, the other of said interceptors having an edge terminating just short of said line of visual reference to intercept all light rays except a narrow band between the edges of said interceptors to align said line of visual reference toward a remote reference point, the tilting of the device in one direction moving the interceptors into overlapping relation to intercept all light rays along the line of visual reference.

3. A sighting device comprising a standard, a sight tube mounted on said standard, a pair of interceptors mounted in said tube, one of said interceptors being mounted substantially in alignment with the center of said standard, the other of said interceptor being longitudinally offset and oppositely disposed with respect to said first interceptor, the edges of said interceptors being vertically offset a slight distance when said standard is positioned perpendicular to a line of reference to intercept all light rays except a narrow band between the edges of said interceptors for sighting purposes.

4. Sighting apparatus comprising a standard having a tube mounted thereon with the axis of the tube adapted to be positioned parallel to a line of reference, a pair of light interceptors mounted in oppositely disposed longitudinally offset relation in said tube the edges of said interceptors being offset a slight distance when said tube is positioned parallel to a line of reference to intercept all light rays except a narrow band between the edges of said interceptors, an intermediate sighting element adjustably mounted on a supporting standard to have the upper edge thereof a predetermined distance above the base of said standard, the upper edge of said sighting element being curved on a circular arc having a radius equal to the normal working height of the upper edge of said sighting device above its base, and a sighting target adjustably mounted on a supporting standard, said target having an arcuate marking thereon said marking having an edge thereof curved on an arc of a radius slightly greater than that of the upper edge of the intermediate sighting device.

5. Sighting apparatus comprising a standard having a tube mounted thereon with the axis of the tube adapted to be positioned horizontally, a pair of interceptors mounted in oppositely disposed longitudinally offset relation in said tube, the edges of said interceptors being vertically offset a slight distance when said tube is directed toward a sighting element, a target having a transverse marking thereon, said marking being at a predetermined height above a supporting base element thereof, and an intermediate sighting element having the upper edge with a portion thereof, at a height above the base thereof approximately one quarter inch less than the height of said target marking, to disclose a narrow portion of said target below said marking when said tube, said target, and said intermediate sighting element are in alignment.

6. Sighting apparatus comprising in combination with a sighting device mounted at a predetermined height, a target having an arcuate line thereon at a predetermined distance above its base, said line having a circular curvature with a radius equal to the normal working height thereof, a pair of distinguishing marking elements spaced downwardly from said line, an intermediate sighting element having an arcuate upper edge with a curvature having a radius less than the radius of curvature of said target line and equal to the height of upper edges of said distinguishing markings on said target.

ALBERT L. LEAVITT.